(12) United States Patent
Chandramohan et al.

(10) Patent No.: US 11,609,759 B2
(45) Date of Patent: Mar. 21, 2023

(54) LANGUAGE AGNOSTIC CODE CLASSIFICATION

(71) Applicant: Oracle International Corporation, Redwood Shores, CA (US)

(72) Inventors: Mahinthan Chandramohan, Mansfield (AU); Robert James Wall, Teneriffe (AU)

(73) Assignee: Oracle International Corporation, Redwood Shores, CA (US)

( * ) Notice: Subject to any disclaimer, the term of this patent is extended or adjusted under 35 U.S.C. 154(b) by 110 days.

(21) Appl. No.: 17/192,740

(22) Filed: Mar. 4, 2021

(65) Prior Publication Data

US 2022/0283803 A1 Sep. 8, 2022

(51) Int. Cl.
  *G06F 8/73* (2018.01)
  *G06N 20/00* (2019.01)
(52) U.S. Cl.
  CPC .............. *G06F 8/73* (2013.01); *G06N 20/00* (2019.01)
(58) Field of Classification Search
  CPC ...... G06F 16/285; G06F 9/30036; G06F 8/73; G06N 20/00
  See application file for complete search history.

(56) References Cited

U.S. PATENT DOCUMENTS

| 7,577,939 | B2 * | 8/2009 | Bayardo, Jr. | .......... | G06Q 10/10 709/219 |
| 10,564,945 | B2 * | 2/2020 | Dong | ........................ | G06F 8/37 |
| 11,074,494 | B2 * | 7/2021 | Zhao | ..................... | G06N 3/0445 |
| 2013/0268467 | A1 * | 10/2013 | Yoon | ...................... | G06N 20/00 706/12 |
| 2014/0325472 | A1 * | 10/2014 | Fige | .......................... | G06F 8/35 717/106 |
| 2017/0212829 | A1 * | 7/2017 | Bales | ................... | G06N 3/0454 |

(Continued)

OTHER PUBLICATIONS

Bui, N. D. Q. et al.; "Bilateral Dependency Neural Networks for Cross-Language Algorithm Classification"; 26th IEEE International Conference on Software Analysis, Evolution and Reengineering: SANER 2019: Hangzhou, China, Feb. 24-27, 2019 (12 pages).

(Continued)

*Primary Examiner* — Wei Y Zhen
*Assistant Examiner* — Amir Soltanzadeh
(74) *Attorney, Agent, or Firm* — Ferguson Braswell Fraser Kubasta PC

(57) ABSTRACT

A system may include a computer processor and a repository configured to store a first code fragment including language features represented in a first programming language, and a second code fragment including language features represented in a second programming language. The system may further include a universal code fragment classifier, executing on the computer processor and configured to generate a first universal abstract syntax tree for the first code fragment and a second universal abstract syntax tree for the second code fragment, generate, using a graph embedding model, first vectors for the first universal abstract syntax tree and second vectors for the second universal abstract syntax tree, and classify, by executing an abstract syntax tree classifier on the first vectors and the second vectors, the first code fragment as a first code category and the second code fragment as a second code category.

15 Claims, 8 Drawing Sheets

(56) References Cited

U.S. PATENT DOCUMENTS

2019/0138731 A1* 5/2019 Tan ............... G06F 11/3608
2019/0303141 A1* 10/2019 Li ................. G06F 16/9024
2021/0182037 A1* 6/2021 Hu .................... G06F 8/427
2021/0240826 A1* 8/2021 Kutt ................ G06N 20/00

OTHER PUBLICATIONS

Perez, D. et al.; "Cross-Language Clone Detection by Learning Over Abstract Syntax Trees"; 2019 IEEE/ACM 16th International Conference on Mining Software Repositories (MSR); Piscataway, NJ, USA, May 2019; pp. 518-528 (11 pages).
Zhang, J. et al.; "A Novel Neural Source Code Representation based on Abstract Syntax Tree"; Proceedings of the 41st International Conference on Software Engineering, ICSE '19; Piscataway, NJ, USA, May 2019; pp. 783-794 (12 pages).

* cited by examiner

LANGUAGE AGNOSTIC CODE CLASSIFICATION

BACKGROUND

Conventional machine learning models are limited to classifying code represented in a single programming language. However, it may be the case that available training data is represented in a programming language different from the programming language of the code to which the machine learning model is applied. Thus, a language independent code classification capability that generalizes learning beyond a single programming language is desirable.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a system including a computer processor, a repository configured to store a first code fragment including language features represented in a first programming language, a second code fragment including language features represented in a second programming language, a first universal abstract syntax tree for the first code fragment, and a second universal abstract syntax tree for the second code fragment. The first universal abstract syntax tree and the second universal abstract syntax tree each include at least one language independent feature. The system further includes a universal code fragment classifier, executing on the computer processor and configured to generate the first universal abstract syntax tree for the first code fragment and the second universal abstract syntax tree for the second code fragment, generate, using a graph embedding model, first vectors for the first universal abstract syntax tree and second vectors for the second universal abstract syntax tree, and classify, by executing an abstract syntax tree classifier on the first vectors and the second vectors, the first code fragment as a first code category and the second code fragment as a second code category.

In general, in one aspect, one or more embodiments relate to a method for obtaining a first code fragment including language features represented in a first programming language and a second code fragment including language features represented in a second programming language, and generating a first universal abstract syntax tree for the first code fragment and a second universal abstract syntax tree for the second code fragment. The first universal abstract syntax tree and the second universal abstract syntax tree each include at least one language independent feature. The method further includes generating, using a graph embedding model, first vectors for the first universal abstract syntax tree and second vectors for the second universal abstract syntax tree, and classifying, by executing an abstract syntax tree classifier on the first vectors and the second vectors, the first code fragment as a first code category and the second code fragment as a second code category.

In general, in one aspect, one or more embodiments relate to a method for obtaining a code fragment including language features represented in a programming language, and sending the code fragment to a universal code fragment classifier configured to perform generating a first universal abstract syntax tree for the first code fragment. The universal abstract syntax tree includes at least one language independent feature. The universal code fragment classifier is further configured to perform generating, using a graph embedding model, vectors for the universal abstract syntax tree, classifying, by executing an abstract syntax tree classifier on the vectors, the code fragment as a code category, and transmitting the code category for the code fragment. The method further includes receiving, from the universal code fragment classifier, the code category for the code fragment.

Other aspects of the invention will be apparent from the following description and the appended claims.

DETAILED DESCRIPTION

Figure 1A:
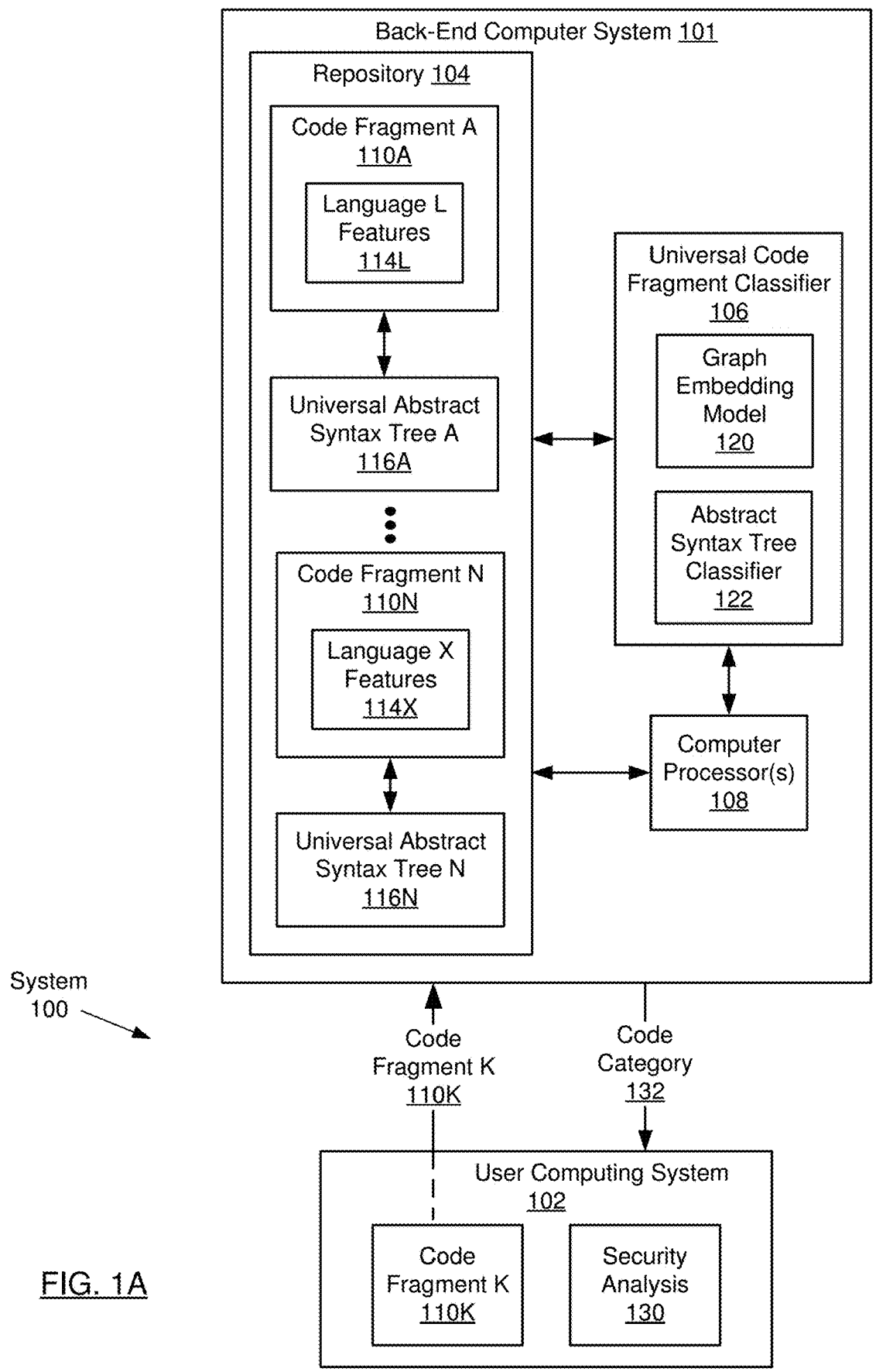
FIG. 1A and FIG. 1B show a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to classifying code fragments. A universal abstract syntax tree is generated for each code fragment. The universal abstract syntax tree is a flexible structure whose schema accommodates code fragments represented in different programming languages. In one or more embodiments, vectors are generated for subtrees of the universal abstract syntax tree using a graph embedding model. The subtrees may correspond to high-level programming language features such as control flow features and/or declaration features. A control flow feature corresponds to a break in the sequential execution of statements within a code fragment. A declaration feature declares a high-level language feature, such as a class, a function, etc. The graph embedding model may aggregate information about language features from nodes in a local neighborhood of a subtree. The vectors are classified as a code category. For example, the code category may be a security relevant category (e.g., taint source or taint sink) or a category relevant to program comprehension (e.g., a cryptographic algorithm or a sorting algorithm). The vectors may be classified by a machine learning model trained using training code fragments that include code fragments represented in multiple programming languages. The classifier may include the capability to generalize knowledge learned from training code fragments to code fragments represented in an "unseen" programming language for which there were no training code fragments.

FIG. 1A shows a system (100) in accordance with one or more embodiments of the invention. As shown in FIG. 1A, the system (100) includes a back-end computer system (101) and a user computing system (102). In one or more embodiments, the back-end computer system (101) and the user computing system (102) take the form of the computing system (500) described with respect to FIG. 5A and the accompanying description below or take the form of the client device (526) described with respect to FIG. 5B. The back-end computer system (101) includes a repository (104), a universal code fragment classifier (106), and computer processor(s) (108).

In one or more embodiments, the repository (104) is any type of storage unit and/or device (e.g., a file system, database, collection of tables, or any other storage mechanism) for storing data. Further, the repository (104) may include multiple different storage units and/or devices. The multiple different storage units and/or devices may or may not be of the same type or located at the same physical site. The repository (104) may be accessed online via a cloud service (e.g., Amazon Web Services (AWS), Egnyte, Azure, etc.).

In one or more embodiments, the repository (104) includes functionality to store code fragments (110A, 110N) and universal abstract syntax trees (116A, 116N). Code fragments (110A, 110N) are collections of computer instructions (e.g., statements) written in source code of a human-readable programming language. Code fragments (110A, 110N) include language features (114L, 114X). Language features (114L) are syntactic constructs included in the code fragment (110A). Examples of language features (114L) include operators, expressions, statements, classes, declarations, methods, functions, interfaces, packages, commands, identifiers, etc.

Each code fragment (110A) corresponds to a universal abstract syntax tree (116A). The universal abstract syntax tree (116A) is a tree representation of the syntactical structure of the corresponding code fragment (110A). The universal abstract syntax tree (116A) includes a schema capable of representing code fragments (110A, 110N) of multiple programming languages. The universal abstract syntax tree (116A) is "abstract" in the sense that the universal abstract syntax tree (116A) includes structural and/or content-related details of the code fragment (110A) while omitting one or more syntactic details of the code fragment (110A). For example, because grouping parentheses are implicit in the tree structure of the universal abstract syntax tree (116A), the universal abstract syntax tree (116A) may omit nodes corresponding to the grouping parentheses. The nodes of the universal abstract syntax tree (116A) may be generated from the code fragment (110A) by a compiler or a parser.

Figure 1B:
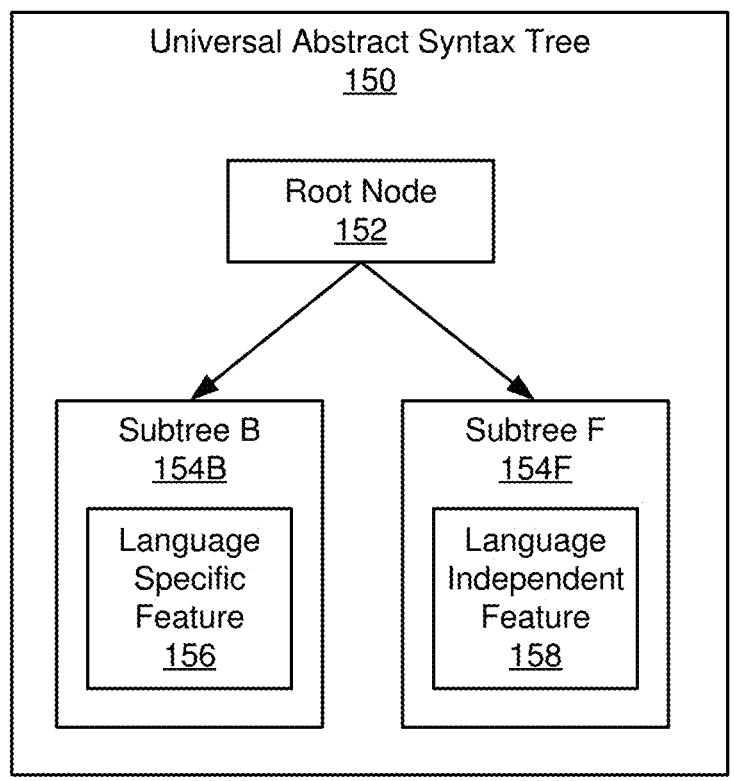

Turning to FIG. 1B, the universal abstract syntax tree (150) includes a root node (152) and subtrees (e.g., subtree B (154B) and subtree F (154F)). Subtree B (154B) and subtree F (154F) are distinct from each other, but they are both specified as having a relationship to the root node (152). Additional subtrees may be present which branch out from subtree B (154B) and/or subtree F (154F), and/or the root node (152). The root node (152) may include a language feature that corresponds to a starting point of a code fragment (110A). For example, the root node (152) may include a language feature called "module", "file", "program", or "compilation unit," etc. Each subtree includes a subset of the nodes of the universal abstract syntax tree (150). A subtree may be defined recursively. That is, the nodes of a subtree may, in turn, include a root node of the subtree and subtrees of the subtree, etc. Alternatively, the subtree may include a single node, such as a node that includes a simple language feature (e.g., an identifier or a constant).

A subtree (154B) may include a language specific feature (156) that is specific to a programming language. That is, the language specific feature (156) may be specific to the programming language in which the code fragment (110A) corresponding to the universal abstract syntax tree (150) is represented. For example, the language specific feature may be an "assignment" feature that is specific to Python or Java. Alternatively, a subtree (154F) may include a language independent feature (158) that is common across multiple programming languages, such as an "identifier" feature that is used in Python, Java, and other programming languages.

Returning to FIG. 1A, the universal code fragment classifier (106) includes a graph embedding model (120) and an abstract syntax tree classifier (122). The graph embedding model (120) includes functionality to embed a subtree (e.g., subtree B (154B) or subtree F (154F)) as a vector. In one or more embodiments, the graph embedding model (120) is a machine learning model that includes functionality to learn a function that generates a vector for a first node by sampling and aggregating information about language features from nodes in the local neighborhood of the first node. For example, the first node may be a root node of a subtree, and the nodes in the local neighborhood may include descendant nodes (e.g., child nodes, grandchild nodes, etc.) of the root node of the subtree and/or ancestor nodes (e.g., parent nodes, grandparent nodes, etc.) of the root node of the subtree. The graph embedding model (120) may implemented using a graph neural network (e.g., the GraphSAGE neural network) that includes functionality to generate embeddings (e.g., vectors) for graph structures. The graph embedding model (120) includes functionality to generate similar embeddings for subtrees that share similar contexts (e.g., subtrees that include similar language features).

The universal code fragment classifier (106) includes functionality to apply the graph embedding model (120) to generate a vector for a subtree (e.g., subtree B (154B) or subtree F (154F)). In one or more embodiments, the subtree is a high-level subtree that includes a high-level language feature. For example, the root node of the high-level subtree may correspond to the high-level language feature. The high-level language feature may be a control flow feature that corresponds to a break in the sequential execution of statements in the portion of the code fragment (110A) corresponding to the subtree. That is, executing the control flow feature may cause execution to jump to a location in the code fragment (110A) other than the next sequential statement in the code fragment (110A). For example, the control flow feature may be an iteration (e.g., loop) statement or a conditional branch statement. Alternatively, the high-level language feature may be a declaration feature. The declaration feature may declare a high-level language feature, such as a class, a method, a function, a procedure, etc. The high-level language feature may be a language specific feature. For example, FIG. 4B shows a universal abstract syntax tree (402B) that includes the following subtrees corresponding to high-level language specific features: a Java method declaration subtree (432) and a Java variable declaration subtree (436). Alternatively, the high-level language feature may be a language independent feature. For example, FIG. 4B shows a universal abstract syntax tree (402B) that includes a subtree corresponding to a high-level language independent feature: a universal block subtree (434).

The abstract syntax tree classifier (122) may be a neural network model. The abstract syntax tree classifier (122) includes functionality to classify, as a code category (132), a collection (e.g., a sequence) of input vectors. The collection of input vectors may be generated from a universal abstract syntax tree (116A). The code category (132) may correspond to a function performed by the code fragment (110A) corresponding to the universal abstract syntax tree (116A).

Each input vector may correspond to a high-level subtree of the universal abstract syntax tree (116A). In one or more embodiments, generating vectors for high-level subtrees that include high-level language features focuses the abstract syntax tree classifier (122) on the high-level function(s) performed by the code fragment (110A) corresponding to the universal abstract syntax tree (116A). In one or more embodiments, the abstract syntax tree classifier (122) assigns confidence levels where each confidence level indicates a probability that the corresponding code category describes a function performed by the code fragment corresponding to the universal abstract syntax tree.

For example, the code category (132) may be a security category relevant to performing a security analysis (130). Continuing this example, the security category may be "taint source", "taint sink", or "sanitizer." The security analysis (130) may analyze a codebase to detect security vulnerabilities. For example, a security vulnerability may correspond to a flow of "tainted" data from a taint source to a taint sink without processing the data by a sanitizer. A taint source may receive potential attacker-controllable input. A taint sink may perform a security-sensitive operation (e.g., by executing the JavaScript eval operator). A sanitizer is a statement or function that transforms a potentially tainted value into a safe (e.g., trusted) value that is not associated with a security vulnerability. For example, a sanitizer may modify a value by encoding or replacing potentially dangerous characters with harmless equivalents. Continuing this example, the potentially dangerous characters may be filtered or escaped.

As another example, the code category (132) may be a category relevant to program comprehension (e.g., by a debugger), such as a cryptographic algorithm or a sorting algorithm. Alternatively, the code category (132) may be a code defect category, such as variable misuse. Still alternatively, the code category (132) may be a name of the code fragment (110A), such as a variable or method name.

The abstract syntax tree classifier (122) may be trained using training code fragments that include code fragments represented in multiple programming languages. The abstract syntax tree classifier (122) may include functionality to perform transfer learning. That is, the abstract syntax tree classifier (122) may include the capability to generalize knowledge learned from training code fragments to code fragments represented in an "unseen" programming language for which there were no training code fragments. In other words, the training code fragments may exclude code fragments represented in the unseen programming language. Thus, training the abstract syntax tree classifier (122) is scalable because the training code fragments are not required to include code fragments in each programming language that the abstract syntax tree classifier (122) is intended to support.

Continuing with FIG. 1A, the user computing system (102) may be a mobile device (e.g., phone, tablet, digital assistant, laptop, etc.) or any other computing device (e.g., desktop, terminal, workstation, etc.) with a computer processor (not shown) and memory (not shown) capable of running computer software. The user computing system (102) includes functionality to send a code fragment (110K) to the universal code fragment classifier (106). The user computing system (102) includes functionality to receive a code category (132) for the code fragment (110K) from the universal code fragment classifier (106). The user computing system (102) includes functionality to perform a security analysis (130) using the code fragment (110K).

In one or more embodiments, the computer processor(s) (108) takes the form of the computer processor(s) (502) described with respect to FIG. 5A and the accompanying description below. In one or more embodiments, the computer processor (108) includes functionality to execute the universal code fragment classifier (106).

While FIG. 1A shows a configuration of components, other configurations may be used without departing from the scope of the invention. For example, various components may be combined to create a single component. As another example, the functionality performed by a single component may be performed by two or more components.

Figure 2:
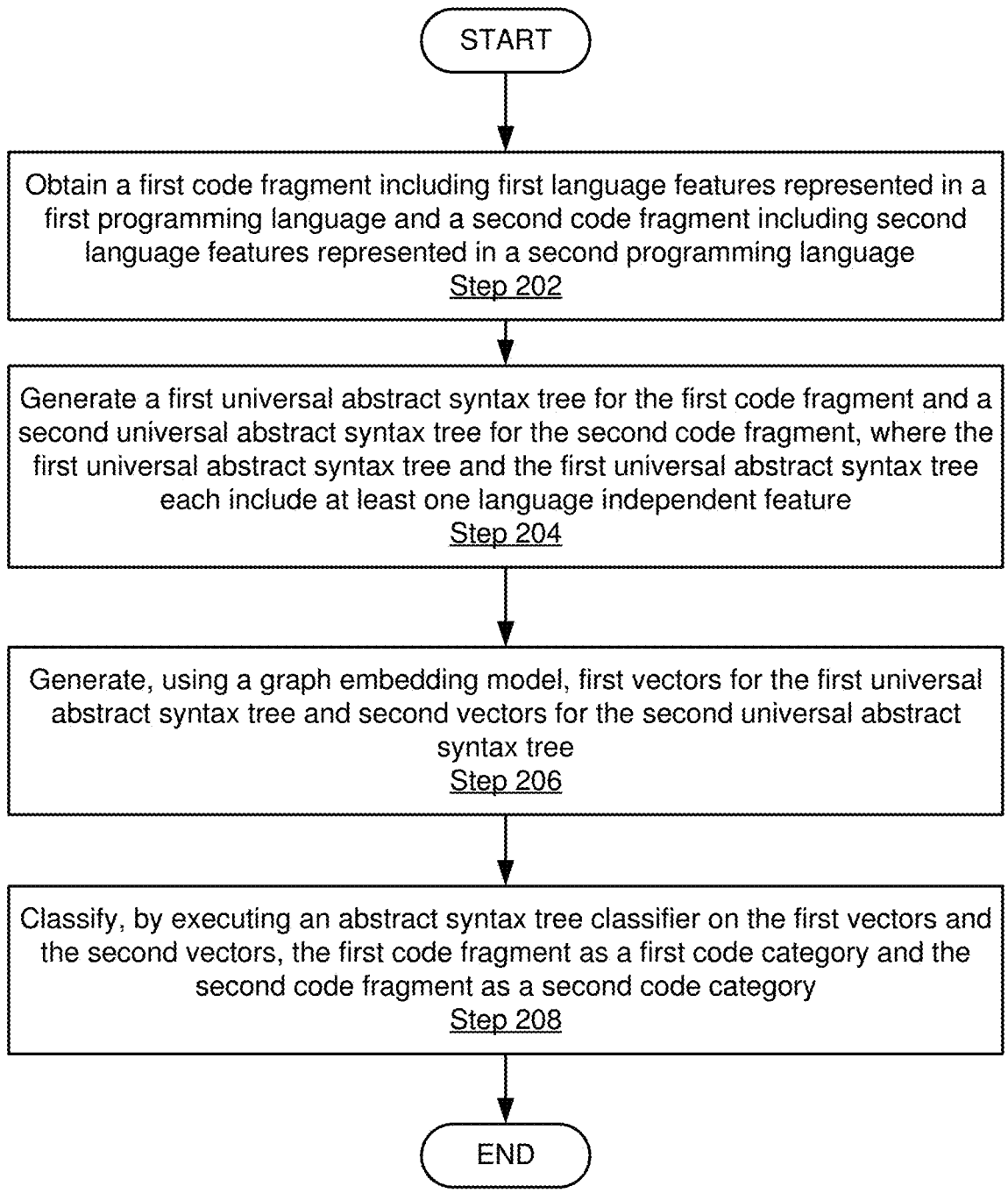
FIG. 2, FIG. 3A, and FIG. 3B show flowcharts in accordance with one or more embodiments of the invention.

FIG. 2 shows a flowchart in accordance with one or more embodiments of the invention. The flowchart depicts a process for classifying a code fragment. One or more of the steps in FIG. 2 may be performed by the components (e.g., the universal code fragment classifier (106) of the back-end computer system (101) and/or the user computing system (102), discussed above in reference to FIG. 1A). In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 202, a first code fragment including first language features represented in a first programming language and a second code fragment including second language features represented in a second programming language are obtained. The first code fragment and the second code fragment may be obtained from a repository. The first language features and the second language features may be operators, expressions, statements, and/or other syntactic constructs included in the first code fragment and the second code fragment.

In Step 204, a first universal abstract syntax tree for the first code fragment and a second universal abstract syntax tree for the second code fragment are generated. The first universal abstract syntax tree and the second universal abstract syntax tree may include language specific and/or language independent features. The first universal abstract syntax tree and the second universal abstract syntax tree may include one or more high-level subtrees that include high-level features. Examples of high-level features include control flow features and declaration features.

Prior to generating a universal abstract syntax tree, the universal code fragment classifier may generate a language specific abstract syntax tree for a code fragment. Then, the universal code fragment classifier may convert the language specific abstract syntax tree to a universal abstract syntax tree. For example, the universal code fragment classifier may generate a universal abstract syntax tree from the language specific abstract syntax tree using a universal source code parser.

In Step 206, first vectors for the first universal abstract syntax tree and second vectors for the second universal abstract syntax tree are generated using a graph embedding model. In one or more embodiments, the first vectors and the second vectors are vectors generated for high-level subtrees that include high-level features (see Step 204 above). For example, the universal code fragment classifier may use the graph embedding model to embed each of the high-level subtrees as a single unit.

In Step 208, the first code fragment is classified as a first code category and the second code fragment is classified as a second code category by executing an abstract syntax tree classifier on the first vectors and the second vectors. In one or more embodiments, generating the first vectors and the second vectors for high-level subtrees that include high-level language features (as described in Step 206 above) focuses the abstract syntax tree classifier on the high-level function(s) performed by the first code fragment and the second code fragment. In one or more embodiments, the abstract syntax tree classifier classifies a code fragment as a code category based on confidence levels assigned to different code categories where each confidence level indicates a probability that the corresponding code category describes a function performed by the respective code fragment. For example, a code fragment may be classified as the code category corresponding to the highest confidence level.

In one or more embodiments, the abstract syntax tree classifier fails to classify the first code fragment and/or the second code fragment as any code category when none of the confidence levels assigned to a code category exceeds a threshold.

In one or more embodiments, a security analysis may be performed (e.g., by the user computing system) using the first code fragment and/or the second code fragment. For example, the first code category and/or the second code category may be a category relevant to performing the security analysis. For example, the security category may "taint source", "taint sink", or "sanitizer."

Figure 3A:
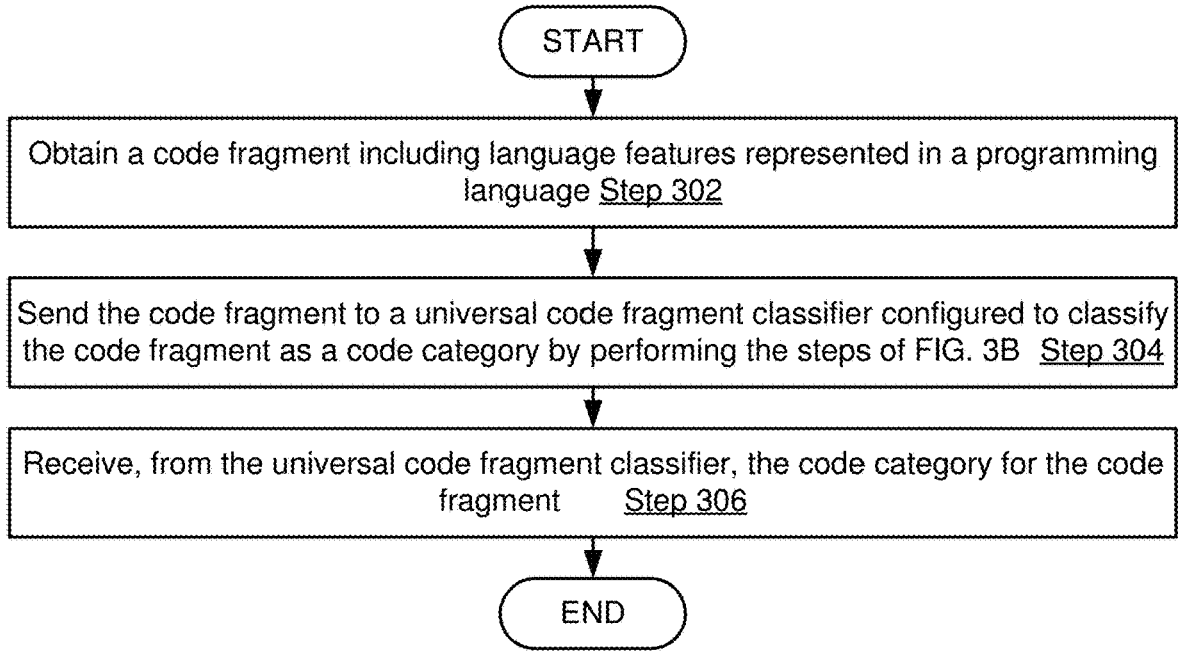

FIG. 3A shows a flowchart in accordance with one or more embodiments of the invention. The flowchart depicts a process for classifying a code fragment. One or more of the steps in FIG. 3A may be performed by the components (e.g., the universal code fragment classifier (106) of the back-end computer system (101) and/or the user computing system (102), discussed above in reference to FIG. 1A). In one or more embodiments of the invention, one or more of the steps shown in FIG. 3A may be omitted, repeated, and/or performed in parallel, or in a different order than the order shown in FIG. 3A. Accordingly, the scope of the invention should not be considered limited to the specific arrangement of steps shown in FIG. 3A.

Initially, in Step 302, a code fragment including language features represented in a programming language is obtained (see description of Step 202 above).

Figure 3B:
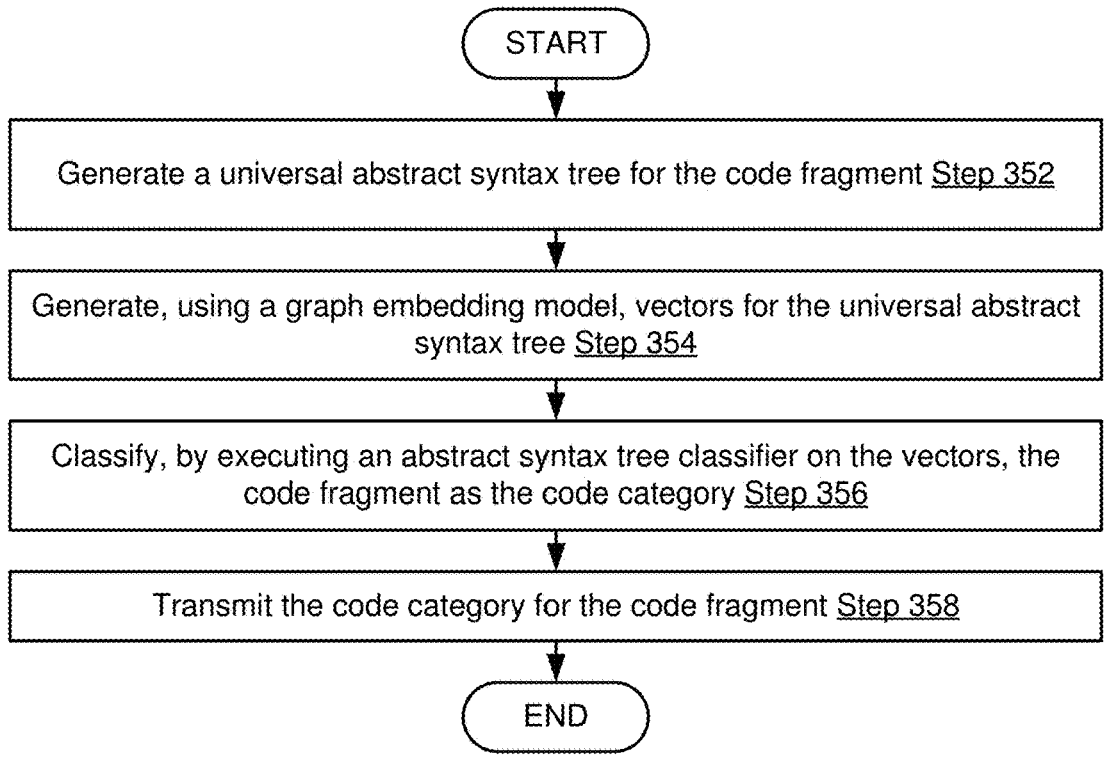

In Step 304, the code fragment is sent to a universal code fragment classifier configured to classify the code fragment as a code category by performing the steps of FIG. 3B. The code fragment may be sent to the universal code fragment classifier via a network (e.g., network (520) of FIG. 5B).

In Step 306, the code category for the code fragment is received from the universal code fragment classifier. The code category for the code fragment may be received from the universal code fragment classifier via the network.

FIG. 3B shows a flowchart in accordance with one or more embodiments of the invention. The flowchart depicts a process for classifying a code fragment. One or more of the steps in FIG. 3B may be performed by the components (e.g., the universal code fragment classifier (106) of the back-end computer system (101) and/or the user computing system (102), discussed above in reference to FIG. 1A). In one or more embodiments of the invention, one or more of the steps shown in FIG. 3B may be omitted, repeated, and/or performed in parallel, or in a different order than the order shown in FIG. 3B. Accordingly, the scope of the invention should not be considered limited to the specific arrangement of steps shown in FIG. 3B.

Initially, in Step 352, a universal abstract syntax tree for the code fragment is generated (see description of Step 204 above).

In Step 354, vectors for the universal abstract syntax tree are generated using a graph embedding model (see description of Step 206 above).

In Step 356, the code fragment is classified as the code category by executing an abstract syntax tree classifier on the vectors (see description of Step 208 above).

In Step 358, the code category for the code fragment is transmitted. The code category for the code fragment may be transmitted by the universal code fragment classifier via the network.

Figure 4A:
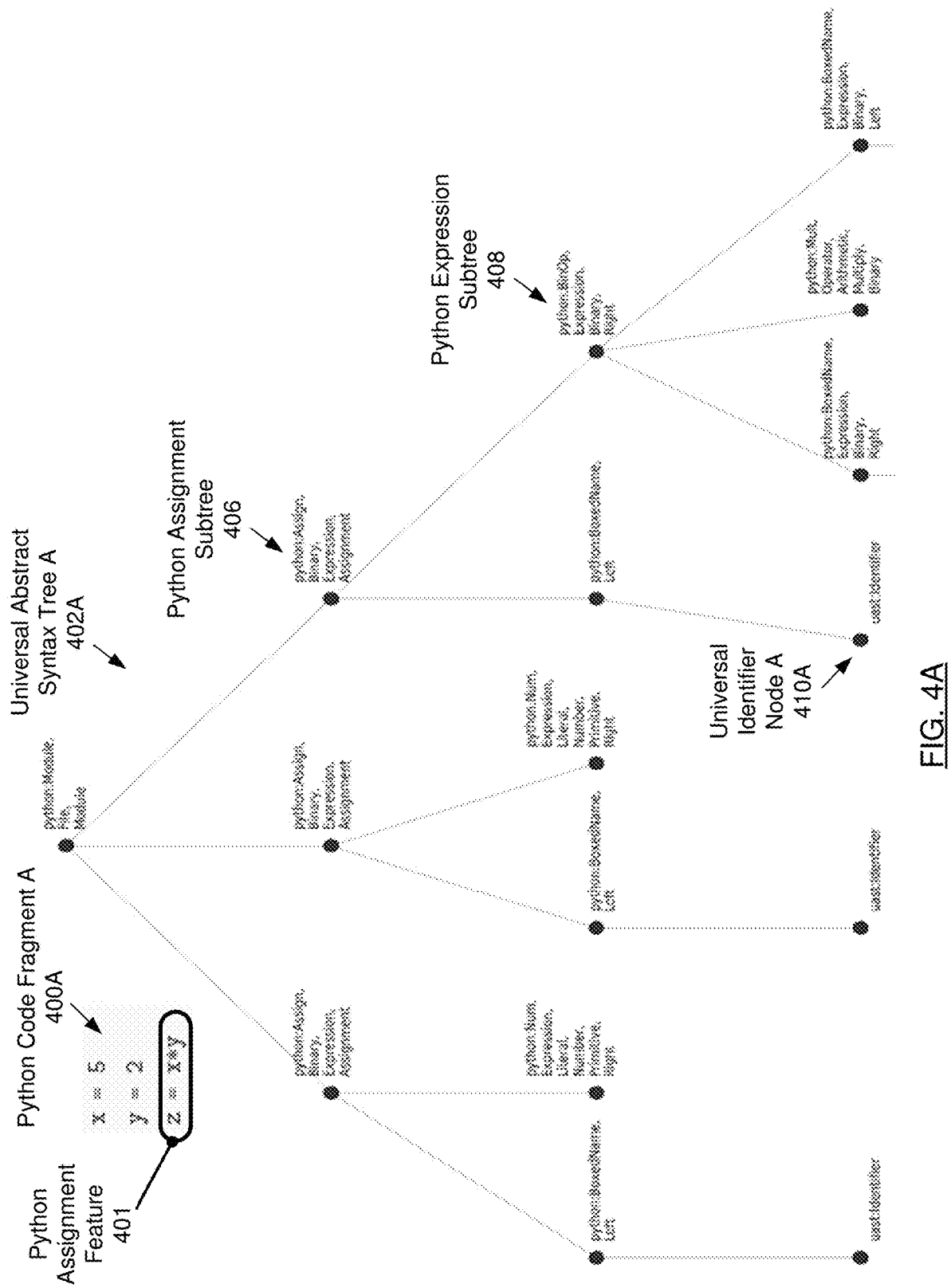
FIG. 4A, FIG. 4B, and FIG. 4C show examples in accordance with one or more embodiments of the invention.
Figure 4B:
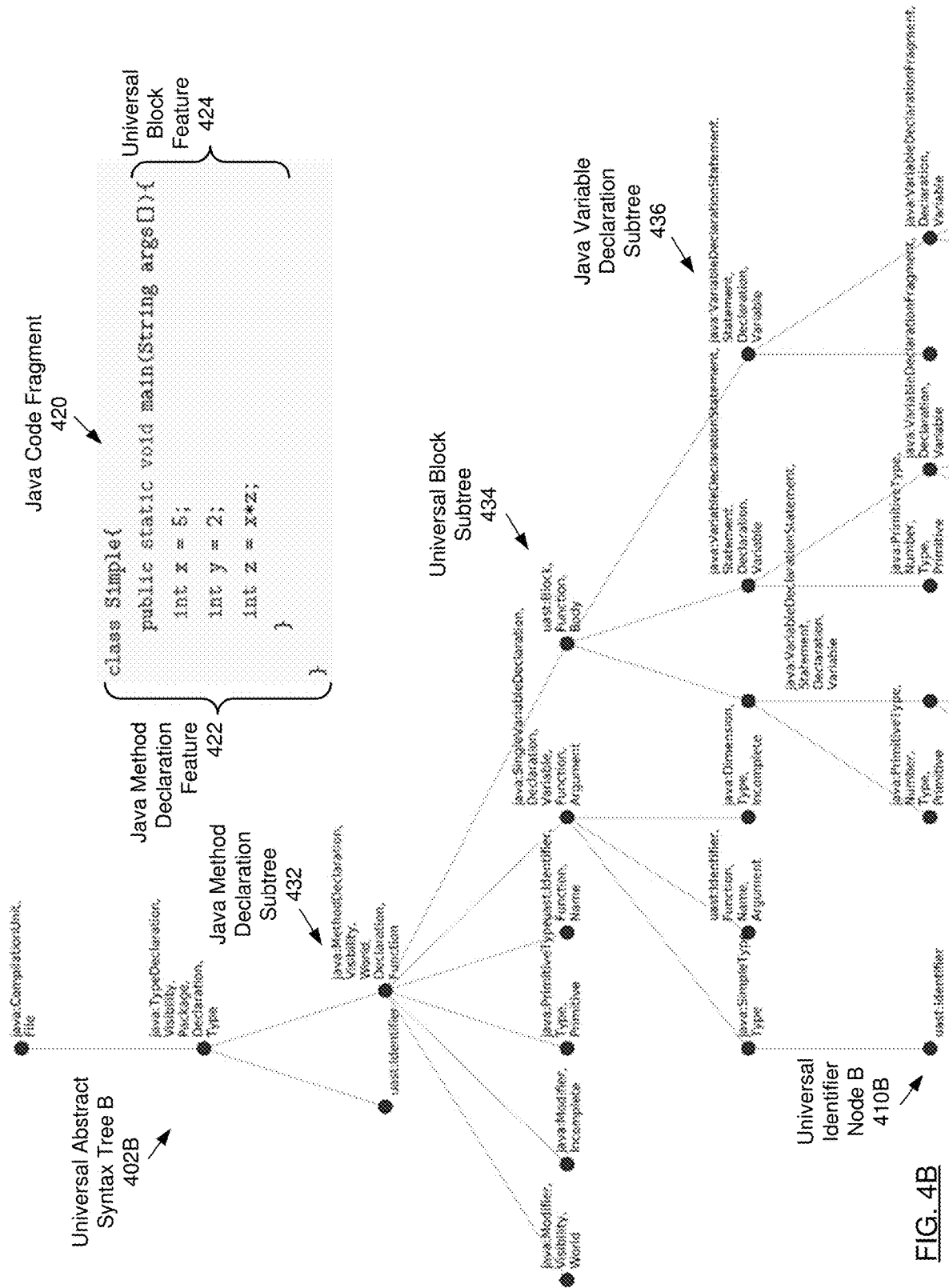
Figure 4C:
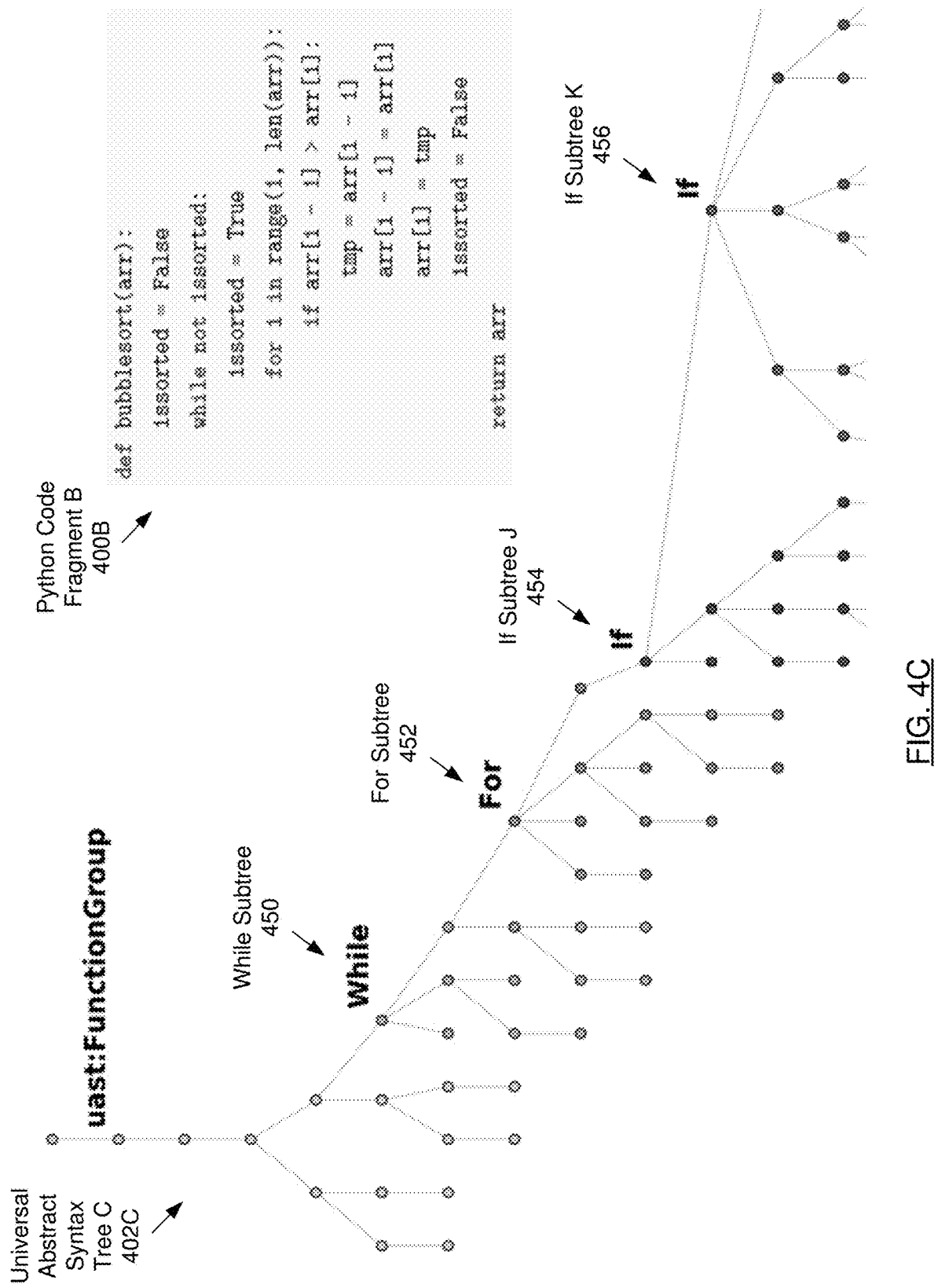

FIG. 4A, FIG. 4B, and FIG. 4C show an implementation example(s) in accordance with one or more embodiments. The implementation example(s) are for explanatory purposes only and not intended to limit the scope of the invention. One skilled in the art will appreciate that implementation of embodiments of the invention may take various forms and still be within the scope of the invention.

FIG. 4A shows Python code fragment A (400A) ((110A, 110N, 110K) in FIG. 1A) that includes Python language features, including Python assignment feature "z=x*y" (401) ((114L, 114X) in FIG. 1A). Python assignment feature "z=x*y" (401) is a Python-specific language feature that includes a Python-specific expression sub-feature "x*y" and a universal (e.g., Python-independent) identifier sub-feature "z". The universal code fragment classifier generates universal abstract syntax tree A (402A) ((116A, 116N) in FIG. 1A and (150) in FIG. 1B) from Python code fragment A (400A). Universal abstract syntax tree A (402A) includes Python assignment subtree (406), which corresponds to Python assignment feature "z=x*y" (401). Python assignment subtree (406) includes Python expression subtree (408), which corresponds to the expression sub-feature "x*y" of Python assignment feature "z=x*y" (401). Universal abstract syntax tree A (402A) also includes universal identifier node A (410A), which corresponds to the sub-feature "z" in Python assignment feature "z=x*y" (401).

FIG. 4B shows a Java code fragment (420) that includes a Java method declaration feature (422). Java method declaration feature (422) is a Java-specific language feature that includes a universal (e.g., Java-independent) block sub-feature (424) corresponding to the function (e.g., method) body. The universal block sub-feature (424) includes Java-specific variable declaration sub-features, including a Java-specific variable declaration sub-feature for the variable "z".

The universal code fragment classifier generates universal abstract syntax tree B (402B) from the Java code fragment (420). Universal abstract syntax tree B (402B) includes Java method declaration subtree (432), which corresponds to the Java method declaration feature (422). Java method declaration subtree (432) includes universal block subtree (434), which corresponds to the universal block sub-feature (424).

Universal abstract syntax tree B (402B) also includes Java variable declaration subtree (436), which corresponds to the Java-specific variable declaration sub-feature for the variable "z". Universal abstract syntax tree B (402B) also includes universal identifier node B (410B), which corresponds to a universal identifier sub-feature within universal block sub-feature (424). Universal identifier node B (410B) corresponds to a variable declared within the universal block sub-feature (424).

FIG. 4C shows a Python code fragment B (400B) that includes high-level control flow features, including a "while" feature, a "for" feature, and an "if" feature. The universal code fragment classifier generates universal abstract syntax tree C (402C) from Python code fragment B (400B). Universal abstract syntax tree C (402C) includes the following subtrees corresponding to the high-level control flow features:

1) While subtree (450), corresponding to the "while" feature;
2) For subtree (452), corresponding to the "for" feature;
3) If subtree J (454), corresponding to a branch condition sub-feature of the "for" feature; and
4) If subtree K (456), corresponding to the "if" feature.

The universal code fragment classifier generates, using the graph embedding model, vectors for the above subtrees. The universal code fragment classifier then classifies, by executing the abstract syntax tree classifier on the vectors, Python code fragment B (400B) as a "bubblesort" code category. In this scenario, the abstract syntax tree classifier is a neural network trained with training code fragments represented in multiple languages. However, the abstract syntax tree classifier was not trained with any Python code fragments. Even though the abstract syntax tree classifier was not trained with Python code fragments, the abstract syntax tree classifier is able to classify Python code fragment B (400B).

Embodiments disclosed herein may be implemented on a computing system specifically designed to achieve an improved technological result. When implemented in a computing system, the features and elements of this disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities that implement the features and elements of the disclosure.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5A:
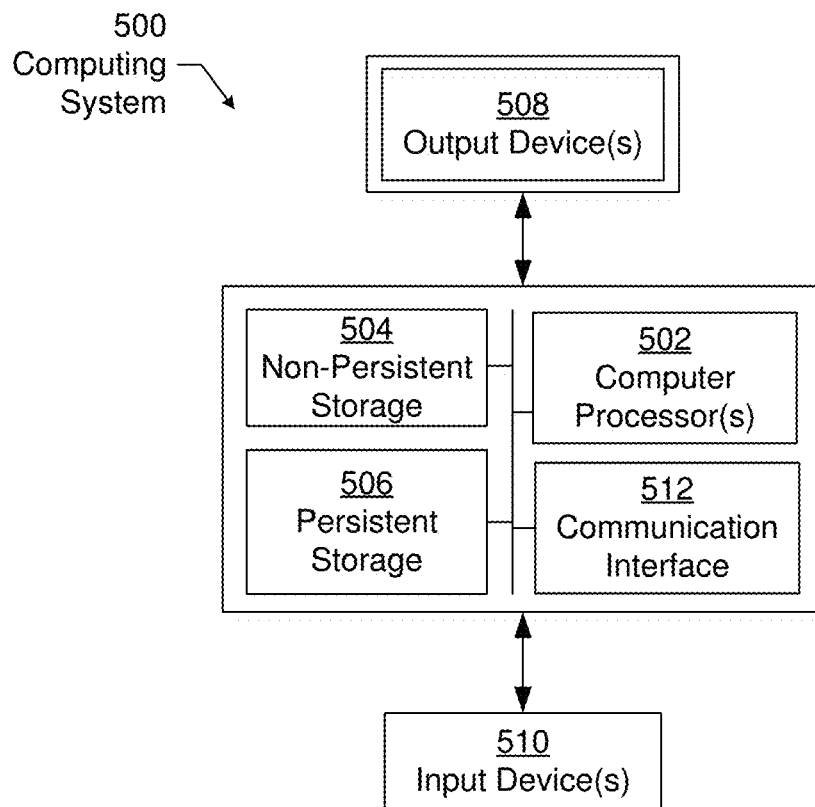
FIG. 5A and FIG. 5B show computing systems in accordance with one or more embodiments of the invention.
Figure 5B:
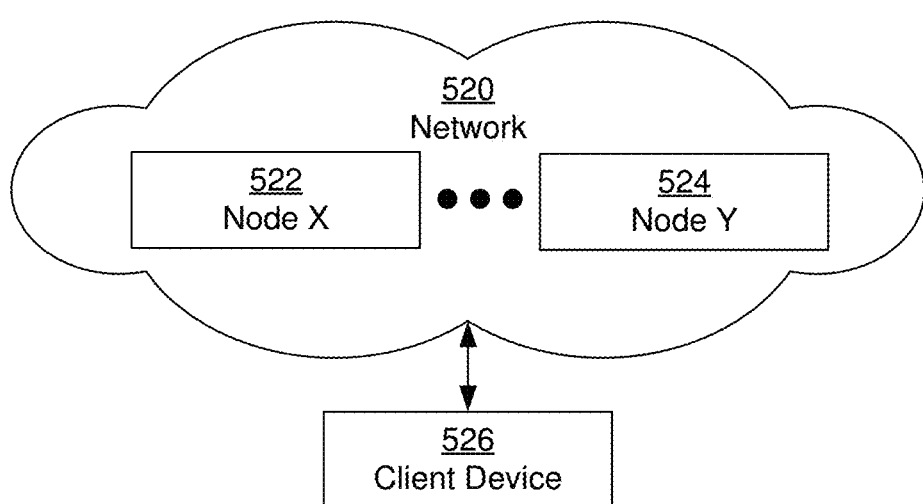

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system comprising:
 a computer processor;
 a repository configured to store:
  a first code fragment comprising a first plurality of language features represented in a first programming language,
  a second code fragment comprising a second plurality of language features represented in a second programming language,
  a first universal abstract syntax tree for the first code fragment, and
  a second universal abstract syntax tree for the second code fragment, wherein the first universal abstract syntax tree and the second universal abstract syntax tree each comprise at least one language independent feature; and
 a universal code fragment classifier executing on the computer processor and configured to:
  generate the first universal abstract syntax tree for the first code fragment and the second universal abstract syntax tree for the second code fragment,
  generate, using a graph embedding model, a first plurality of vectors for the first universal abstract syntax tree and a second plurality of vectors for the second universal abstract syntax tree,
  classify, by executing an abstract syntax tree classifier on the first plurality of vectors and the second plurality of vectors, the first code fragment as a first code category and the second code fragment as a second code category, train the abstract syntax tree classifier using training code fragments comprising first code fragments represented in the first programming language and second code fragments represented in the second programming language, obtain a third code fragment comprising third language features represented in a third programming language, wherein the training code fragments exclude code fragments represented in the third programming language, generate a third universal abstract syntax tree for the third code fragment, wherein the third universal abstract syntax tree comprises at least one language independent feature, generate, using the graph embedding model, a third plurality of vectors for the third universal abstract syntax tree, and classify, by executing the abstract syntax tree classifier on the third plurality of vectors, the third code fragment as a third code category.

2. The system of claim 1, wherein the universal code fragment classifier is further configured to:
in response to classifying the first code fragment as the first code category, perform a security analysis using the first code fragment, wherein the first code category is a security relevant category.

3. The system of claim 1,
wherein the first universal abstract syntax tree comprises a subtree for a first language feature of the first plurality of language features,
wherein the first language feature is one selected from a group consisting of a control flow statement and a declaration statement, and
wherein the first plurality of vectors comprises a vector for the subtree.

4. The system of claim 3, wherein the first universal abstract syntax tree comprises a plurality of nodes, wherein the subtree comprises a first node of the plurality of nodes, and wherein the universal code fragment classifier is further configured to generate the first plurality of vectors by:
identifying, for the first node, a subset of the plurality of nodes in a local neighborhood of the first node, and
aggregating information from a subset of the first plurality of language features corresponding to the subset of the plurality of nodes in the local neighborhood of the first node.

5. The system of claim 1, wherein the universal code fragment classifier is further configured to:
generate a language-specific abstract syntax tree for the first code fragment and the first programming language, and
convert the language-specific abstract syntax tree to the first universal abstract syntax tree.

6. The system of claim 1,
wherein the first universal abstract syntax tree further comprises a first language-specific feature that is specific to the first programming language, and
wherein the second universal abstract syntax tree further comprises a second language-specific feature that is specific to the second programming language.

7. A method comprising:
obtaining a first code fragment comprising a first plurality of language features represented in a first programming language and a second code fragment comprising a second plurality of language features represented in a second programming language;

generating a first universal abstract syntax tree for the first code fragment and a second universal abstract syntax tree for the second code fragment, wherein the first universal abstract syntax tree and the second universal abstract syntax tree each comprise at least one language independent feature;

generating, using a graph embedding model, a first plurality of vectors for the first universal abstract syntax tree and a second plurality of vectors for the second universal abstract syntax tree;

classifying, by executing an abstract syntax tree classifier on the first plurality of vectors and the second plurality of vectors, the first code fragment as a first code category and the second code fragment as a second code category;

training the abstract syntax tree classifier using training code fragments comprising first code fragments represented in the first programming language and second code fragments represented in the second programming language;

obtaining a third code fragment comprising third language features represented in a third programming language, wherein the training code fragments exclude code fragments represented in the third programming language;

generating a third universal abstract syntax tree for the third code fragment, wherein the third universal abstract syntax tree comprises at least one language independent feature;

generating, using the graph embedding model, a third plurality of vectors for the third universal abstract syntax tree; and classifying, by executing the abstract syntax tree classifier on the third plurality of vectors, the third code fragment as a third code category.

8. The method of claim 7, further comprising:
in response to classifying the first code fragment as the first code category, performing a security analysis using the first code fragment, wherein the first code category is a security relevant category.

9. The method of claim 7,
wherein the first universal abstract syntax tree comprises a subtree for a first language feature of the first plurality of language features,
wherein the first language feature is one selected from a group consisting of a control flow statement and a declaration statement, and
wherein the first plurality of vectors comprises a vector for the subtree.

10. The method of claim 9, wherein the first universal abstract syntax tree comprises a plurality of nodes, wherein the subtree comprises a first node of the plurality of nodes, and wherein generating the first plurality of vectors comprises:
identifying, for the first node, a subset of the plurality of nodes in a local neighborhood of the first node; and
aggregating information from a subset of the first plurality of language features corresponding to the subset of the plurality of nodes in the local neighborhood of the first node.

11. The method of claim 7, further comprising:
generating a language specific abstract syntax tree for the first code fragment and the first programming language; and
converting the language specific abstract syntax tree to the first universal abstract syntax tree.

12. The method of claim 7,
wherein the first universal abstract syntax tree further comprises a first language specific feature that is specific to the first programming language, and
wherein the second universal abstract syntax tree further comprises a second language specific feature that is specific to the second programming language.

13. A method comprising:
obtaining a first code fragment comprising a first plurality of language features represented in a first programming language;
sending the first code fragment to a universal code fragment classifier configured to perform operations comprising:
  generating a first universal abstract syntax tree for the first code fragment, wherein the first universal abstract syntax tree comprises at least one language independent feature,
  generating, using a graph embedding model, a first plurality of vectors for the first universal abstract syntax tree,
  classifying, by executing an abstract syntax tree classifier on the first plurality of vectors, the first code fragment as a first code category,
  transmitting the first code category for the first code fragment,
  training the abstract syntax tree classifier using training code fragments comprising first code fragments represented in the first programming language and second code fragments represented in the second programming language,
  obtaining a third code fragment comprising third language features represented in a third programming language, wherein the training code fragments exclude code fragments represented in the third programming language,
  generating a third universal abstract syntax tree for the third code fragment, wherein the third universal abstract syntax tree comprises at least one language independent feature,
  generating, using the graph embedding model, a third plurality of vectors for the third universal abstract syntax tree, and
  classifying, by executing the abstract syntax tree classifier on the third plurality of vectors, the third code fragment as a third code category; and
receiving, from the universal code fragment classifier, the first code category for the first code fragment.

14. The method of claim 13, wherein the universal code fragment classifier is further configured to:
in response to classifying the first code fragment as the first code category, perform a security analysis using the first code fragment, wherein the first code category is a security relevant category.

15. The method of claim 13,
wherein the first universal abstract syntax tree comprises a subtree for a first language feature of the first plurality of language features,
wherein the first language feature is one selected from a group consisting of a control flow statement and a declaration statement, and
wherein the first plurality of vectors comprises a vector for the subtree.

\* \* \* \* \*